June 18, 1968   R. A. MacGREGOR   3,388,800
AXIAL FLOW, COMPRESSIBLE ELEMENT, FILTER UNIT
WITH BYPASS MEANS
Filed Dec. 2, 1965
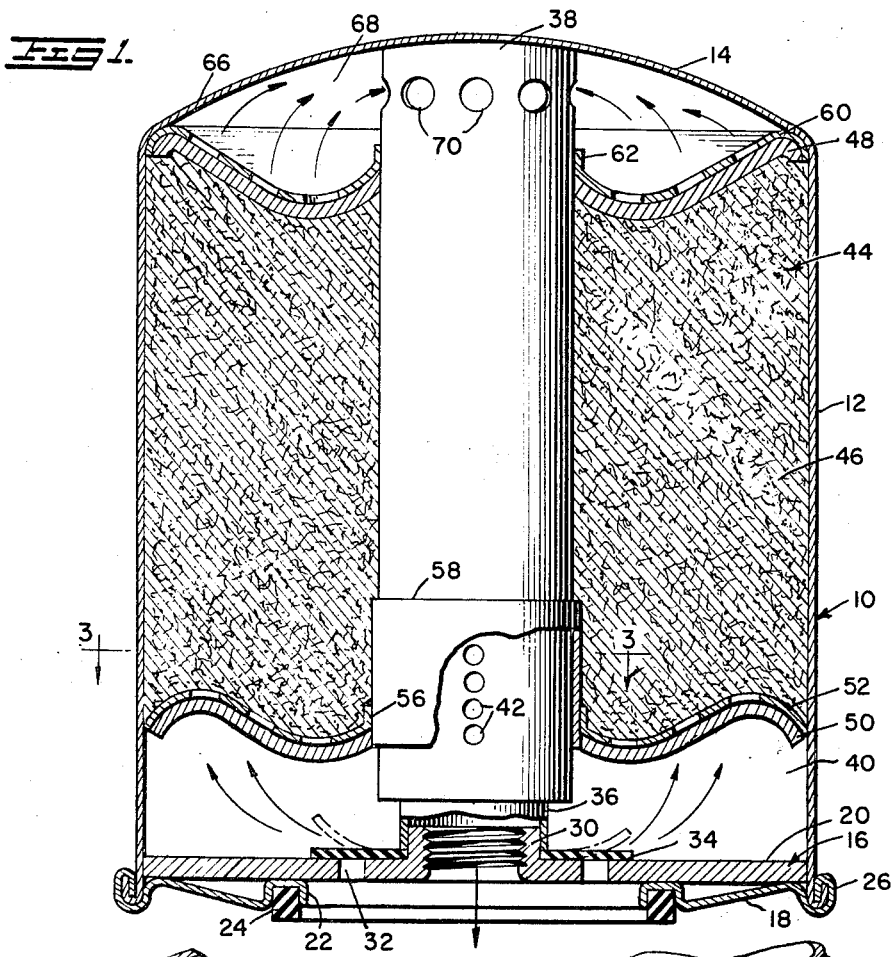
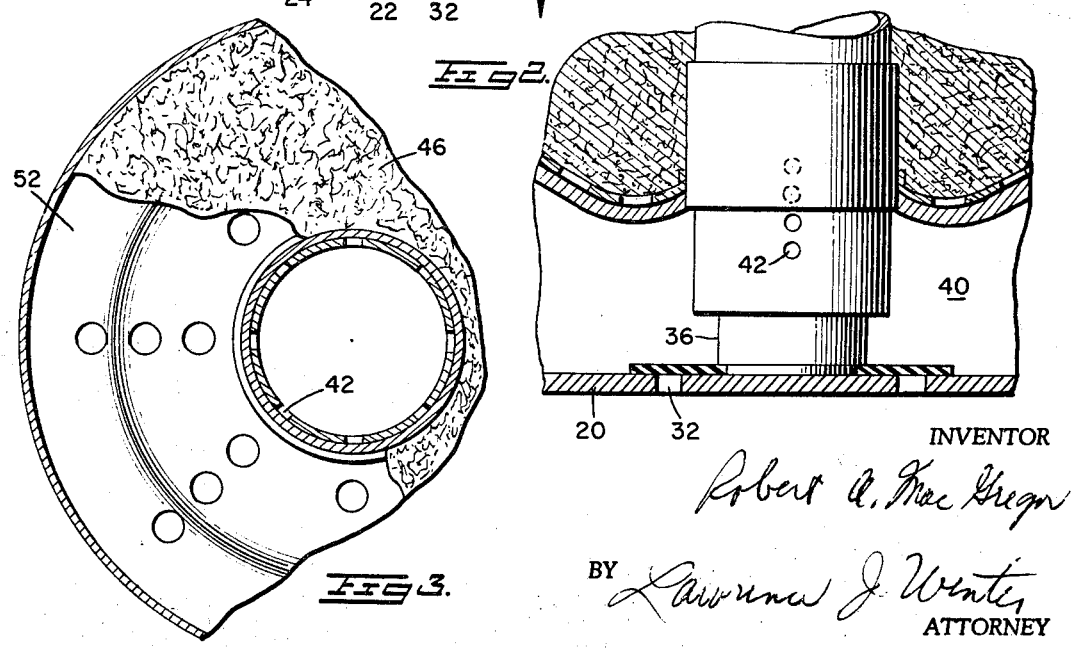
INVENTOR
Robert A. MacGregor
BY Lawrence J. Winter
ATTORNEY

3,388,800
AXIAL FLOW, COMPRESSIBLE ELEMENT, FILTER UNIT WITH BYPASS MEANS

Robert A. MacGregor, Olney, Ill., assignor to Champion Laboratories, Inc., West Salem, Ill., a corporation of Connecticut
Filed Dec. 2, 1965, Ser. No. 511,585
9 Claims. (Cl. 210—131)

ABSTRACT OF THE DISCLOSURE

A spin-on throwaway type filter in which is disposed an annular filter mass between end caps with one of the end caps being slidable on a center tube so as to uncover bypass port means when the filter becomes clogged to progressively increase bypassing of the oil past the filter mass.

---

The present invention relates to an oil filter for removing dirt and contaminants from oil passed therethrough.

The present invention further relates to an oil filter that is commonly known as a full flow oil filter that is adapted to be mounted directly on the engine block of an internal combustion engine, although it is not to be limited to this particular use only since it will be apparent from the following description that it can be used in many other installations and systems, if desired. However, for purposes of illustration only, the oil filter of the present invention will be described in connection with its use for filtering the oil in an internal combustion engine such as a passenger vehicle.

The present invention further relates to a spin-on or screw-on type oil filter that is mounted onto the engine block of an internal combustion engine and which is unthreaded therefrom when the filter element has been clogged with contaminants and dirt, and discarded, and another disposable filter is thereafter screwed onto the engine block.

In accordance with the present invention, all of the oil that is used to lubricate the parts of the engine is passed from the engine block into the oil filter after which it is filtered or cleaned by flowing through the filter element or cartridge therein, and the oil is then returned to the engine block. It is apparent that this full flow oil filter must be capable of passing oil to the surfaces of the engine to be lubricated at all times, and at a sufficient rate to prevent any damage to the engine, even though the oil filter element within the oil filter unit has become excessively contaminated so as to either prevent the flow of oil through the filter element or reduce the flow of oil through the filter element to such an extent that the engine will not be provided with sufficient oil to properly lubricate its parts. Accordingly, it is therefore necessary that a provision be made in such a full flow oil filter unit for bypassing oil around the filtering element or cartridge whenever flow through the element is impeded or interrupted for any reason, or there is undue restriction through the filter element such as an excessive pressure drop thereacross.

The bypassing of unfiltered oil through the filter element can be avoided by changing the filter unit before the filter element becomes so clogged with dirt and contaminants that is is unable to permit a sufficient flow of oil therethrough to properly lubricate the engine parts. Also, even if the filter unit were clean and not clogged, since the oil is more viscous during cold starting or initial starting of an engine if all of the oil has to flow through the filter cartridge or element, because of a high viscosity, sufficient oil may not be supplied to properly lubricate the engine parts under such conditions.

In accordance with the present invention one object is to provide a spin-on type oil filter unit that is provided with means for permitting the oil to bypass the filter element under any conditions, even if the oil is viscous due to cold starting of the engine.

It is another object of the present invention to provide a spin-on type oil filter unit for an internal combustion engine with a filter cartridge therein and bypass valve means for supplying sufficient oil to the engine should the filter cartridge be clogged for any reason whatsoever.

It is another object of the present invention to provide a filter unit that can be readily discarded when the filter element therein becomes clogged and which filter unit is provided with shunt means therein which will permit a predetermined quantity of oil to flow around the filter cartridge so that the full flow oil filter will always enable enough oil to flow through the engine to properly lubricate its parts.

It is another object of the present invention to provide a full flow type oil filter having bypass means therein providing a parallel flow path through the oil filter unit when the filter element begins to become clogged due to the filtering out of dirt and contaminants from the oil.

It is another object of the present invention to provide a spin-on type oil filter unit having bypass means for bypassing oil around the filter element which has a bypass porting area that increases in proportion to the clogging of the filter element, or proportional to the decrease in the flow rate through the filter cartridge or element.

It is another object of the present invention to provide a full flow type oil filter having a depth type fibrous filter mass therein that is compressed by the end cap means of the filter element as the rate of flow through the oil filter decreases, and the amount of clogging of the end cap means increases.

It is yet another object of the present invention to provide a full flow oil filter having a depth type filter media therein and bypass valve means including a slidable member which moves longitudinally of the filter media as the media becomes clogged with contaminant so as to open a bypass port means to permit the incoming oil to short-circuit the oil filter unit.

It is another object of the present invention to provide bypass means so located in a full flow oil filter unit so as to combine with the contaminant retention capabilities of a depth filter media to minimize contaminant reentry into the engine with the opening of the bypass port means in the oil filter unit.

In accordance with the present invention, a filtering media of the depth type fibrous mass is utilized, as distinguished from a pleated filter paper or surface type filter, and the depth type media is so chosen, and the density of the packing of the fibrous mass is predetermined, so as to provide a certain resiliency of the filtering mass or media. The filtering media is generally retained between two perforated end cap means including fibrous filter disks affixed to the cap and the normal oil flow is through the oil inlet means of the oil filter unit, and then through the filter disk affixed to the upstream end cap and then through the depth type filter media in a longitudinal direction, after which the clean oil is discharged through a center tube means and passed out of the oil filter unit and back into the engine block of a vehicle.

Under conditions of normal oil flow, depending upon the permeability of the end cap means adjacent the upstream side of the oil filter cartridge or element, the end cap means will be caused to move so as to compress the filter media. As the end cap means moves, a slidable member to which it is fixed and which is mounted on the center tube means, will be caused to move away from the inlet end of the oil filter unit or to slide along the center tube means, and progressively uncover bypass port means in the center tube means. The compression force developed by the movable end cap means will be dependent on the rate of oil flow and the amount of clogging of the fibrous filter disk affixed to the sliding end cap.

Various other advantages and objects and features of the present invention will be readily apparent from the following detailed description when considered in connection with the accompanying drawings forming a part hereof, and in which:

FIGURE 1 is a vertical section taken through an oil filter unit embodying the present invention;

FIGURE 2 is a fragmentary vertical section, similar to FIGURE 1, but illustrating the bypass means in an open position so that a portion of the oil bypasses the filter element, and FIGURE 3 is a fragmentary section taken along the line 3—3 of FIGURE 1.

Referring to the drawing, the reference numeral 10 generally designates an oil filter unit that is provided with a thin walled cylindrical metal casing or housing 12. It will be noted that the upper end of the casing 12 is provided with a closed dome 14 while the lower end of the casing is open and has a reinforced circular member or plate 16 closing off its open end. The closure or bottom member 16 is disposed within the interior of the casing 12 and is secured to a sheet metal retainer plate 18. The retainer plate 18 is disposed around the outer or circumferential portion 20 of the closure member and is provided adjacent its inner end with a circular rib or recess 22 in which is disposed a resilient sealing gasket or member 24, which seats upon the block of an engine, not shown. The outer end of the retainer plate 18 forms a liquid-tight seal as indicated at 26 with the bottom edge of the casing 12.

The closure member 16 is provided with a central upturned nipple 30 that is internally threaded so that the oil filter unit can be screwed onto the engine block of a vehicle. Circumferentially spaced oil inlet ports 32 are provided in the closure plate 16 around the nipple or boss 30. An annular anti-drainback valve 34 consisting of a resilient material such as neoprene, rubber, or the like, is disposed on the closure member over the oil inlet port 32.

A filter support member 36 is mounted on the nipple 30 and bears against the anti-drainback valve 34 to keep it properly seated over the oil inlet ports. The sleeve 36 has an outwardly extending rim disposed within the lower edge of the center tube 38 and secured thereto so as to close off the lower end of the center tube 38. The positioning of the center tube 38 on the sleeve 36 provides an oil inlet flow chamber 40 adjacent the closure member 16.

The center tube 38 extends centrally of the casing 12 and has its upper edge abutting the inner surface of the dome shaped portion 14 of the casing. The center tube is provided with a plurality of vertically disposed circumferentially spaced oil bypass ports 42 therein. The bypass ports 42 are disposed adjacent the lower end of the center tube 38.

The filter element or cartridge is generally designated 44 and comprises an annular portion 46 of suitable filtering material of the depth type media, such as random packed cotton fibers, wood fibers, and other naturally occurring fibers, such as sisal or hemp fibers. The filter media 46 is packed between the outer surface of the center tube 38 and the inner surface of the casing 12, and extends longitudinally of the center tube 38. The upper and lower ends of the filter media 46 are closed or sealed off by end cap means 48 and 50. The front upstream end cap means 50 consist of a perforated annular metal disc 52 of S-shaped configuration and a similar fibrous felt filtering disc 54 affixed to the upstream side of the metal disc. The inner end of the perforated member 52 is provided with an upturned rim 56 that is secured to the outer surface of a vertical sleeve 58. The sleeve 58 is slidably disposed on the center tube 38, and during normal operation of the oil filter unit closes off the bypass ports 42 as shown in FIGURE 1.

The upper end cap means 48 consist of a perforated annular plate 60 similar in configuration to the plate 52 and having an inturned or upturned inner ring 62 fitting it around the upper portion of the center tube 38. Another felt disc 64 is disposed adjacent the upper end cap 60. The upper end cap 60 is disposed with its outer portion 66 abutting the dome shaped portion 14 and the end cap forms an oil discharge chamber 68 with the dome shaped portion 14. The center tube 38 is provided with a plurality of circumferentially and laterally spaced oil outlet ports 70 therein for discharging clean oil into the center tube from the filter elements, said elements to be considered the media 46 and felt discs 54 and 46.

In operation, under normal conditions of operation the oil to be filtered enters the inlet ports 32 and unseats the valve disc 34 as indicated in dotted lines in FIGURE 1. The oil thereafter flows upwardly toward the rear and through the fibrous filtering disc 54 and through the perforated end cap 52 and the felt disc 54 in a longitudinal direction through the depth type filter mass 46. The clean oil is discharged through the upper end cap 60 and thereafter passes through the oil discharge chamber 68 and into the ports 70 in the center tube 38, thereafter passing downwardly through the center tube, and is finally discharged through the boss 30 back into the engine block, not shown.

During this time the slidable sleeve member 58 is disposed over the oil bypass ports 42 so that none of the oil will be unfiltered and will not bypass the filter media. Gradually as the filter media removes more dirt and contaminants from the oil being passed therethrough, they become clogged and the rate of flow through the filter media is progressively reduced. Gradually as the filter media and discs remove more dirt and contaminants from the oil being passed therethrough, they become clogged and the pressure differential across the filtering elements will increase if a rate of flow is maintained constant. As the pressure differential increases across the fibrous disc 54, it will tend to be forced in the downstream direction, sliding the perforated end cap 52 and further compressing the media. As end cap means 50 is gradually moved downstream, i.e., upwardly, slidable sleeve 58 will so move as to uncover the lower ports 42 of the bypass porting area. As the filter media becomes progressively clogged with a greater amount of contaminants the end cap means 50 will move progressively upwardly in the casing 12 so that the slidable sleeve member 58 will eventually uncover all of the vertically disposed bypass ports 42 so that the bypass porting area increases in proportion to the clogging of the filter media. When this occurs a portion of the oil will completely bypass the filter media as the lowermost ports 42 are uncovered, and eventually all of the ports will be uncovered so that the complete filter element will be bypassed and the oil will be flowing through all of the porting area.

Thus with the present invention a full flow spin-on type disposable oil filter is provided with simplified bypass means for clogged filter media conditions.

The present invention further provides a non-mechanical bypass valve that is actuated by increased differential pressure developing as flow is maintained across a filtering disc becoming progressively resistant, by virtue of clogging, to flow of oil being filtered.

The present invention further provides an end cap means to which is operatively connected a slidable sleeve member that will be caused to move away from the closure member of the oil filter and progressively uncover bypass oil ports or holes in the center tube of the filter element so that the bypass porting area will increase in proportion to the increase in differential pressure developed across filtering elements as the oil pump maintains flow against the resistance of progressing clogging.

From the foregoing description it will be apparent that changes may be made in the form, location and relative arrangement of the different parts of the invention without departing from the principle of the invention, and thus the invention is not to be limited except by the scope of the following claims.

What is claimed is:

1. A throwaway oil filter comprising a casing open at one end, a closure member closing off said one end, a threaded nipple on said closure member forming an oil outlet port, oil inlet port means in said closure member around said outlet port, a sleeve mounted on said nipple, a center tube on said sleeve extending to the top of said casing, a movable sleeve mounted on said center tube, an annular perforated end cap fixedly secured to said movable sleeve member, an annular depth type filter media surrounding said center tube and supported on said end cap and extending to the side wall of said casing, another annular perforated end cap engaging the top of said filter media and fixedly secured to said center tube, an oil outlet chamber above said another end cap, oil outlet means in said center tube above said another end cap, and bypass port means in the lower end of said tube disposed to be covered by said movable sleeve member when the differential pressure across said filter media is below a predetermined value.

2. The oil filter of claim 1 wherein said oil bypass port means consist of vertically spaced openings in said center tube.

3. The oil filter of claim 1 wherein said filter media is packed with a density of predetermined resiliency.

4. The oil filter of claim 1 wherein an annular felt disc is disposed adjacent each of said end cap means with the filter media sandwiched therebetween.

5. A spin-on oil filter comprising a cylindrical casing open at one end, a circular bottom member closing off said open end, a threaded nipple on said bottom member extending into said casing forming an oil outlet port, oil inlet port means in said bottom member disposed around said outlet port, a filter element support member mounted on said nipple, a center tube mounted on said support member and extending to the top of said casing, said tube having a plurality of vertically aligned bypass ports in the bottom thereof, a slidable sleeve disposed on said center tube normally closing off said bypass ports, an annular perforated end cap secured to said slidable sleeve, an annular felt disc disposed adjacent said end cap, an annular filter element consisting of depth type fibrous media surrounding said center tube and supported on said end cap and extending to the side wall of said casing, another annular perforated end cap fixedly secured to the upper end of said tube and engaging the top of said fibrous media, an oil discharge chamber above said another end cap, and means communicating the discharge chamber with the interior of said center tube, whereby a clogged filter media causes said end cap and sleeve to move upwardly and progressively uncover said bypass ports.

6. The filter of claim 5 wherein said bypass ports are spaced circumferentially around said tube.

7. The filter of claim 5 wherein said end caps are S-shaped and have an upturned rim on the inner end.

8. The filter of claim 7 wherein said means communicating the discharge chamber with said tube is a plurality of circumferential and laterally disposed openings in said tube above said another end cap.

9. The filter of claim 8 wherein an annular cover plate is secured to the outside of said bottom member with sealing means for sealing it against an engine block.

References Cited

UNITED STATES PATENTS

| | | | |
|---|---|---|---|
| 2,079,365 | 5/1937 | Thomas | 210—130 |
| 2,110,009 | 3/1938 | Weidenbacker | 210—131 |
| 2,298,674 | 10/1942 | Burhans | 210—131 |

REUBEN FRIEDMAN, *Primary Examiner.*

F. SPEAR, *Assistant Examiner.*